United States Patent Office

3,434,993
Patented Mar. 25, 1969

3,434,993
AQUEOUS EMULSION OF EMULSIFIABLE OXIDIZED POLYETHYLENE
Frank A. Mirabile, Wayne, and Steven T. Rabel, Boonton, N.J., assignors, by mesne assignments, to Allied Chemical Corporation, New York, N.Y., a corporation of New York
No Drawing. Filed Nov. 16, 1964, Ser. No. 411,583
Int. Cl. C08f 27/04, 27/22, 47/16
U.S. Cl. 260—29.6    4 Claims This invention relates to an emulsifiable polymer composition, a process for utilizing same and the product resulting therefrom. More particularly this invention relates to an emultifiable oxidized polyethylene composition and products resulting therefrom. The invention is also concerned with a process for transforming said emulsifiable oxidized polyethylene compositions into a polyethylene emulsion.

As used herein the term "polyethylene" includes all known polyethylenes today, including the well known conventional low density branched polyethylene as described in U.S. 2,153,553 issued to E. Fawcett et al. and the more recent high density linear polyethylenes as described in U.S. 2,816,883 issued to Larchar et al.

As used herein the term "emulsifiable polyethylene" means polyethylene which has been oxidized to the extent that it contains at least 1.0 milliequivalents carboxyl per gram of oxidized polymer.

As used herein, unless otherwise specified, the term "emulsion" means a polyethylene dispersion in which water forms the continuous phase.

In the commercial field today, emulsions of polyethylene are formed predominantly by two methods. One method is an emulsion polymerization process where the ethylene monomer is polymerized at temperatures of 80–140° C. in an aqueous media in combination with an alcohol in the presence of emulsifying agents and a free radical catalyst, e.g., potassium persulfate. The drawback to this method is that the entire output of polyethylene is in emulsion form with fixed emulsifier type and concentration thus restricting its end uses. The other emulsion-forming method employed widely is to oxidize polyethylene and then emulsify the thus oxidized polyethylene in water at elevated temperatures using a wide variety of types of conventional emulsifying agents. In this latter method, the use of conventional emulsifying agents to form an emulsion of polyethylene has many drawbacks. For example, emulsifiers have a relative high cost and in addition cause the coating resulting from the emulsion to have less resistance to water, solvents and gases. A further and important drawback is the toxicity of many emulsifying agents which precludes the use of emulsions containing certain emulsifying agents in the food packaging industry.

Surprisingly it has now been found that stable emulsions containing oxidizing polyethylene can be prepared without the use of emulsifying agents when the polymer is oxidized to the extent that it contains at least 1.0 milliequivalents carboxyl per gram of oxidized polyethylene. The high carboxyl content allows the oxidized polyethylene to act as its own emulsifier thereby overcoming the aforestated drawback of conventional emulsifying agents. The highly oxidized polyethylene contains both polar and non-polar parts and the polar portion obtained on oxidization allows the polymer to be dissolved in the water phase thus solubilizing the non-polar portion.

The oxidization step employed to obtained oxidized polyethylene containing at least 1.0 milliequivalents carboxyl per gram of polymer is not critical. Various methods, e.g., solid state, suspension or melt oxidation can be used. One solid state method would include passing an oxygen-containing gas into an oven over a solid polyethylene therein at a temperature between about 90° C. up to the crystalline melting point of the polymer. Still another method would be to suspend particles of polyethylene in water or an inert organic solvent and either bubble air through the suspension or pressurize the system with air at temperatures ranging from about 90° C. up to the crystalline melting point of the polymer. Yet another method would be to pass an oxygen-containing gas at a temperature from about 90° C. up to the crystalline melting point of the polymer through a fluidized bed of polyethylene particles. A furhter method would include pressing the polyethylene into film and thereafter passing hot air or other oxygen-containing gas thereover at a temperature of about 90° C. up to the crystalline melting point of the polymer.

A still further method would be to tumble polyethylene crumb in air in a ribbon blender at temperatures of 90° C. up to the crystalline melting point of the polyethylene. In addition, it is also possible to oxidize the polyethylene in the melt by passing an oxygen-containing gas therethrough at a temperature above the crystalline melting point of the polymer for a period sufficient to obtain the required carboxyl content.

In all or any of the aforesaid oxidation methods the critical limit is that the resulting polyethylene contain at least 1.0 milliequivalent carboxyl per gram of polymer. The upper limit for all practical purposes for the carboxyl content is 3.0 milliequivalents/gm. of polymer. A higher carboxyl content is operable but the polymer is usually seriously degraded by the prolonged oxidation.

In all the aforestated methods of oxidizing polyethylene, if desired, a minor amount, i.e., 0.05 to 5% by weight of the polyethylene of an organic peroxide, ozone, nitrogen tetroxide or other oxidation promoter may be blended with the polymer to eliminate the induction period and increase the oxidation rate. Superatmospheric pressure may be used if desired in any of the oxidation methods including those aforestated.

The polyethylene operable in this invention can be produced by many methods well known in the art. For example polyethylene having a density of 0.930–0.980 can be obtained using the Phillips catalyst system, i.e., chromium oxide on a $SiO_2$–$Al_2O_3$ support wherein at least part of the chromium is in the hexavalent state. The polymerization is performed at temperatures of 60–260° C. See U.S. 2,825,721. Another catalyst system capable of forming a high density polyethylene used herein is disclosed in U.S. 2,815,883. Yet another catalyst system consisting essentially of vanadium oxytrichloride and ethyl aluminum dichloride will yield high density polyethylene having a melt index less than 0.01. Still another catalyst system yielding very high molecular weight polyethylene comprises $TiCl_3$ and diethyl aluminum chloride. A still further method of producing a high density linear polyethylene is the Ziegler process wherein the catalyst consists essentially of compounds of metals of Groups IVB, VB, and VIB and an aluminum trialkyl compound as set out in Belgian Patent 533,352 issued to K. Ziegler. Yet another method of forming high density polyethylene operable herein is disclosed in U.S. 2,949,447. Conventional branched low density polyethylene, i.e., 0.90–0.93 g./cc. can be prepared in accord with British 471,590 or U.S. 2,153,553 as well as other well known methods. Thus the polyethylene operable in the instant invention includes conventional branched low density polyethylene, medium density polyethylene and linear high density polyethylene.

The general procedure for performing the present invention is to oxidize the polyethylene, preferably in particulate form, in a suitable apparatus, e.g., a forced draft oven, by passing an oxygen-containing gas, e.g., air, or air enriched with oxygen, over the polymer while the polymer is being heated at temperatures ranging from 90° C. up to the crystalline melting point of the polymer. If melt oxidation is preferred to solid state oxidation, the crystalline melting point temperature is exceeded.

If desired the oxidation induction period can be decreased by admixing the polyethylene with an oxidation promoter, e.g., an organic peroxide (usually 0.05 to 5.0% peroxide by weight of polymer) in a suitable mixing mechanism, e.g., Twin Shell blender, at room temperature. Preferably the organic peroxide is solubilized in a hydrocarbon solvent, which solvent is thereafter evaporated prior to the oxidation step. Solubilizing the peroxide in a solvent insures more uniform dispersion of the peroxide throughout the polymer. Various solvents for the peroxide are operable and the selection of a suitable one is governed by its solvent power on the peroxide or other oxidation promoter employed and its inertness thereto. Operable solvents are well known to those skilled in the art and include volatile aromatic and adiphatic hydrocarbons such as benzene, toluene, pentane, and hexane.

The thus blended polymer-peroxide mixture is then subjected to oxidation as aforestated. If ozone is used as a promoter, it is incorporated into the oxygen-containing gas stream. Since the rate of oxidation increases with increasing temperature up to the crystalline melting point of the polymer, it is preferred to carry out the oxidation at as high a temperature as is possible without melting the polymer when solid state oxidation is employed. Thus temperatures within 5–20° C. below the crystalline melting point of the polymer are usually employed in solid state oxidation.

The oxidation step can be terminated at any operable degree of oxidation, i.e., when the carboxyl content is at least 1.0 milliequivalents per gram, and if desired the polymer can be subsequently stabilized. For example, a suitable antioxidant such as 4,4′-thiobis (6-butyl-metacresol) sold under the trade name "Santonox" by Monsanto Chemical Company or N-phenyl-2-naphthylamine can be added to the oxidized polyethylene. However, it should be noted that stabilization of the oxidized polymer generally is only required to obtain accurate melt index measurements. In actual practice for most applications the oxidized polymer need not be stabilized.

The oxidized polyethylene of the instant invention wherein the carboxyl content is at least 1.0 milliequivalents per gram is readily emulsified in a continuous aqueous phase in the presence of suitable well known water soluble organic an dinorganic bases with alkali metals from Group IA forming the preferred inorganic bases due to the high solubility of their carboxylate salts.

The base is added in an amount in the range of 50 to 150% of the stoichiometric amount required to react with the carboxylic acid groups on the polyethylene.

The aqueous emulsions of the instant invention contain 10–60% total solids by weight. The oxidized polyethylene, base, and water are combined in any order in a reactor equipped wtih an efficient stirrer. If medium or high density polyethylene having a melting point in the range 110–138° C. is employed a pressurized reactor is preferably used. In a pressurized system, the oxidized polyethylene, water and base are heated with vigorous stirring to a temperature ranging from the melting point of the oxidized polyethylene up to 200° C. (preferably 110–160° C.) and maintained thereat for periods ranging from 5 minutes to 5 hours under the pressure of the system. When conventional low density branched oxidized polyethylene is employed the familiar "wax-to-water" method of emulsification can be used if desired. In said method, the oxidized polyethylene and base are heated together at about 120° C. and the resultant mixture is poured into vigorously stirred water at about 90–100° C. for emulsification. In both methods after the emulsion is formed, the emulsion is cooled to room temperature with stirring.

The following examples are set down to illustrate the invention and are not deemed to limit its scope. Throughout the instant invention tests were conducted as follows:

The extent of oxidation of the polyethylene was determined by ascertaining the carboxyl content of the polymeric material by titration by base in the following manner. About 1 gram of the polymer to be analyzed was accurately weighed and dissolved in 100 ml. of xylene by heating to 120–135° C. with stirring in a 500 ml. Erlenmeyer flask on a magnetic stirrer-hot plate. About 10–20 drops of 0.1% soluble thymol blue in absolute ethanol was added. While continuing stirring and maintaining the temperature at 120–135° C., the solution was titrated to a blue end point with standard 0.1 N potassium hydroxide in absolute ethanol.

Calculation:

milliequivs. COOH per gram =
$$\frac{(\text{ml. of KOH})(\text{N of KOH})}{(\text{g. of polyethylene})}$$

Melt indices (MI) were measured under the conditions specified in ASTMD 1238–57T under Condition E (melt index, i.e., MI) and Condition F (high load melt index, i.e., HLMI).

Densities of the polymer in g./cc. were measured under the conditions specified in ASTMD 1505–57T.

Reduced specific viscosity, i.e., RSV, in deciliters/gram was obtained by dissolving 0.1 g. of the polymer for RSV's of 10 and under and 0.02 g. of the polymer for RSV's over 10 in 100 cc. decalin at 135° C. in accord with the procedure of ASTMD 1601–61.

The crystalline melting point of the polymer was measured as the temperature at which birefringence disappears from the sample when viewed through crossed Nicol prisms in a hot stage microscope heated at a rate less than 1° C./min.

The viscosity of the polyethylene emulsions was measured at 23° C. with a Brookfield Viscometer Model LVT using Spindle No. 1 at 60 r.p.m.

The percent of the oxidized polyethylene which is emulsified is measured by filtering the emulsion through a 100 screen at 25° C.

% emulsified =

$$1 - \frac{\text{grams oxidized polymer retained on 100 mesh screen}}{\text{total grams oxidized polymer employed in recipe}} \times 100$$

Total combined oxygen content of the oxidized polyethylene was determined by the method of J. Unterzaucher, Ber, 1940, 73, 391.

Unless otherwise noted, all parts and percentages are by weight.

Example 1

To a 2 quart "Chemco" stirred reactor equipped with a high speed air stirrer was charged 450 parts water, 100 parts of oxidized polyethylene containing 1.4 milliequivalent carboxyl per gram, said polymer having a melt index of 20,000, along with 14.4 cc. of a 50% KOH solution made from KOH assayed at 85%. Air was evacuated from the reactor and the reactor was sealed. Vigorous stirring was commenced and the reactor was heated to 150° C. The mixture was maintained at 150° C. for 30 minutes with vigorous stirring. At the end of this period the stirring was continued, and the reactor was cooled to room temperature and vented. A stable polyethylene emulsion resulted. The starting oxidized polyethylene was shown to be 100% emulsified when filtered through a 100 mesh screen at 25° C. The emulsion contained 20% solids.

Example 2

To a 2 quart "Chemco" stirred reactor equipped with a high speed air stirrer was charged 450 parts water, 100 parts of oxidized polyethylene containing 1.1 milliequivalent carboxyl per gram, said polymer having a melt index of 15,000, along with 9.5 gms. of morpholine. Air was evacuated from the reactor and the reactor was sealed. Vigorous stirring was commenced and the reactor was heated to 150° C. and maintained thereat for 30 minutes. The reactor was cooled to room temperature (25° C.) and vented. 450 grams of water were added to the emulsion and the morpholine salt was dispersed in the water and passed through a 100 mesh screen. No residue remained on the screen evidencing that the starting oxidized polyethylene was 100% emulsified.

The water soluble organic and inorganic bases operable in the instant invention are many and varied and are well know to those skilled in the emulsion art. Examples of said operable bases include but are not limited to, primary, secondary and tertiary amines such as ammonia hydroxide, ethanolamine and triethanolamine and alkali metal bases such as KOH, NaOH and the like.

The following example will show the necessity of oxidizing polyethylene until it contains at least 1.0 milliequivalents of carboxyl per gram in order to obtain an emulsion without the use of an emulsifying agent.

Example 3

To a 2 quart "Chemco" stirred reactor equipped with a high speed air stirrer was charged 450 parts water, 100 parts of oxidized polyethylene containing 0.74 milliequivalents of carboxyl per gram, said polyethylene having a density of 0.995, a melt index of 3200, an a total oxygen content of 4.5%. 14.4 cc. of a 50% KOH solution made from KOH assayed at 85% was added to the reactor and air was evacuated therefrom. The reactor was sealed, vigorous stirring was commenced and the reactor heated to 150° C. After 30 minutes with vigorous stirring at 150° C. the reactor was cooled to room temperature and vented. The reaction product was filtered through a 100 mesh screen at 25° C. 60% of the oxidized polyethylene charged to the reactor remained on the 100 mesh screen thus signifying that the oxidized polymer was not emulsified.

The emulsions resulting from the composition and process of the instant invention can be used in the same way as presently available commercial polyethylene emulsion. For example, the emulsion can be used in paper coating, floor wax and the like.

What is claimed is:
1. An aqueous emulsion composition consisting of (a) emulsifiable oxidized polyethylene containing at least 1.0 milliequivalent carboxyl per gram of polyethylene, (b) a water soluble base in an amount in the range of 50–150% of the stoichiometric amount required to react with the carboxylic acid groups on said oxidized polyethylene and (c) sufficient water to obtain an emulsion containing 10–60% total solids by weight.

2. The composition of claim 1 wherein the base is potassium hydroxide.

3. The composition of claim 1 wherein the base is morpholine.

4. The process of preparing an aqueous emulsion which consists essentially of admixing (a) oxidized emulsifiable polyethylene containing at least 1.0 milliequivalent carboxyl per gram of oxidized polyethylene, (b) 50–150% of the stoichiometric amount of a base necessary to react with the carboxylic acid groups on said oxidized polyethylene and (c) sufficient water to obtain an emulsion containing 10–60% solids by weight, and thereafter emulsifying said mixture in the absence of an emulsifying agent at a temperature ranging from the melting point of said oxidized polyethylene up to 200° C. at a pressure sufficient to maintain the aqueous mixture in the liquid phase.

References Cited

UNITED STATES PATENTS

| 2,879,240 | 3/1959 | Groote et al. | 260—29.6 |
| 2,879,241 | 3/1959 | Groote et al. | 260—29.6 |
| 2,995,533 | 8/1961 | Parmer et al. | 260—29.6 |
| 3,160,621 | 12/1964 | Hagemeyer et al. | 260—94.9 |
| 2,928,816 | 3/1960 | Chapman et al. | 260—94.9 |
| 3,155,644 | 11/1964 | Kehr | 260—94.9 |
| 3,322,711 | 5/1967 | Bush et al. | 260—29.6 |

FOREIGN PATENTS 676,155  12/1963  Canada.

SAMUEL H. BLECH, *Primary Examiner.*

H. ROBERTS, *Assistant Examiner.*

U.S. Cl. X.R.

260—94.9